March 21, 1950  W. G. MILNE  2,500,995
POLE TOP PIN
Filed Oct. 23, 1948
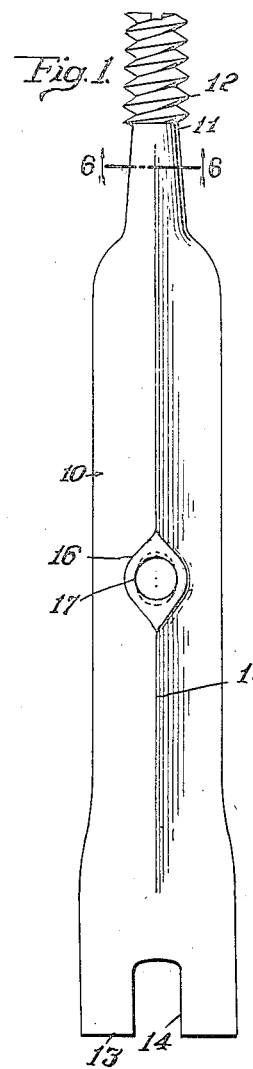
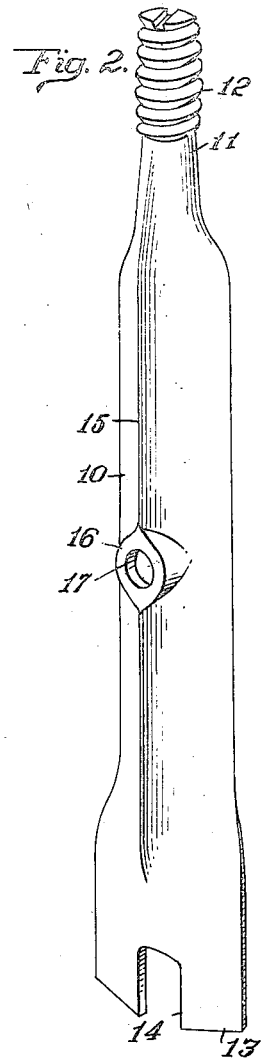
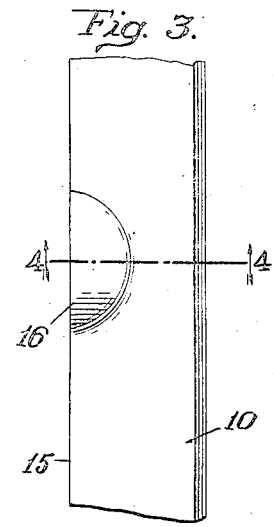
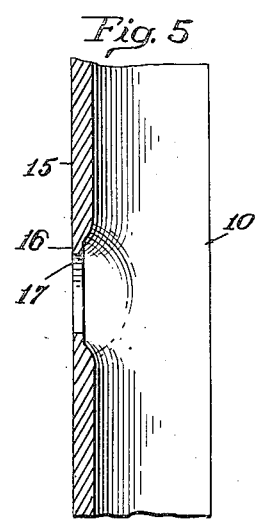
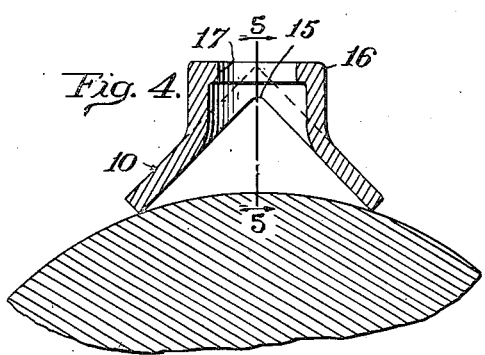
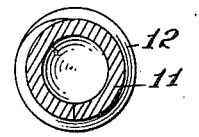
Inventor
W. G. MILNE
By
ATTORNEY Patented Mar. 21, 1950

2,500,995

UNITED STATES PATENT OFFICE 2,500,995

POLE TOP PIN

Winford Gladstone Milne, Hamilton, Ontario, Canada, assignor to N. Slater Company, Limited, Hamilton, Ontario, Canada Application October 23, 1948, Serial No. 56,229

6 Claims. (Cl. 248—220.5)

This invention relates to pole top pins such as are used to support an insulator for carrying a current transmitting wire in vertically spaced relation above the top of a transmission line pole.

Such pole top pins are frequently constructed of lengths of the rolled structural shapes commonly known as angle irons. Pins of this kind usually have a bolt hole punched or drilled through the device about midway of its length at the angle thereof, such bolt hole being for the reception of a bolt securing the pin in position at the upper end of a transmission pole. A bolt hole thus formed has the effect of reducing the cross-sectional area of the pin at the bolt hole location and thus weakening the pin at this point.

One important object of the invention is to provide a device of this character having substantially uniform strength and resistance to bending and other stresses throughout the entire length of its body portion.

A second important object of the invention is to provide a device of this character having a body of substantially uniform cross-section area throughout its entire length.

A third important object of the invention is to provide a device of this character having a body constructed of angle iron and having a bolt hole at the angle of said angle iron, said bolt hole being so constructed and arranged that the section of the body through the bolt hole will be of substantially the same strength as any other section of said body.

The fourth important object of the invention is to provide a device of this type having a body of angle iron construction, said body having a boss extending from the angle of the angle iron and provided with a bolt opening therethrough, the cross-section through the boss and bolt opening being substantially equal to the cross-section through any other portion of said body.

With the above and other objects in view, the invention consists in general of certain novel details of construction and combinations of parts, hereinafter fully described, illustrated in the accompanying drawings, and particularly claimed.

In the accompanying drawings, like characters of reference indicate like parts in the several views and Figure 1 is an elevation of the invention looking at the angle of the angle portion.

Figure 2 is an elevation of the invention taken at a slight angle to the view shown in Figure 1.

Figure 3 is a side elevation of the portion of the angle iron showing the boss.

Figure 4 is a detailed section on the line 4—4 of Figure 3.

Figure 5 is a detailed section on the line 5—5 of Figure 4.

Figure 6 is a section on the line 6—6 of Figure 1.

In the construction of this invention it will be noted that the device is made of a length of what is commonly termed angle iron, this being a rolled structural shape and in the present instance having equal legs. Such a structural shape is indicated in 10 and forms the main body of the device. At its upper end this main body is reduced to a substantially cylindrical neck 11 carrying threads 12 so that an insulator may be screwed on the top of the device. The lower end of the pin is somewhat flattened as at 13, the flattening being sufficient to cause the lower end to fit snugly on an ordinary transmission pole, not here shown. This flattened end is bifurcated as at 14 so as to provide a bolt receiving slot.

About midway the length of the body 10 the material of the body is struck outward at the angle 15 to form a boss 16 and in this boss 16 there is provided a bolt receiving opening 17. This bolt receiving opening is preferably formed by die means without removing any of the material.

In other words, the formation of the boss and the opening 17 is substantially an extrusion process by which the boss is pushed out from the inside of the angle iron and at the same time, or in a subsequent operation, the opening 17 is formed therein. Now under these circumstances, little or no material having been removed from the opening 17, the cross-section area along the line 4—4 of Figure 3 and the line 5—5 of Figure 4 will be seen to be the same as though there was no bolt hole 17 formed at this point since the boss 16 receives the metal displaced from the opening 17.

Under the construction thus formed the pin will be of uniform strength throughout the entire length of its body and thus will resist stresses brought about by the action of wind, sleet, and the like affecting the transmission wires carried by the pole top pins of the transmission line.

It is to be noted that by means of the present construction the pole pin has no loose parts such as washers, the only parts not directly connected to the pin body being the bolts employed to hold the pin on the pole. Inasmuch as it frequently happens that material such as this has to be trucked in to places very difficult of access much loss is frequent where loose parts are employed and thus the disadvantage is obvious and linemen prefer to have single piece construction with practically nothing to get lost.

Another important advantage obtained through the foregoing construction is that the embossed or extruded feature permits piercing of a hole through the body angle for the bolt which not only does not diminish the strength at the point but the extruded displaced material forms a very desirable seat for the nut or the head of the bolt.

At times it is desirable to use what is known as "double arming." That is to say the use of two such pins, one on either side of a transmission pole.

With the present construction a single bolt through the middle is all that is necessary to hold this middle portion firmly in each of the pins, the bolt head resting against one pin and a nut on the other pin.

It is to be observed that the displaced material is not entirely circular in shape but is slightly more extended laterally of the pin body than longitudinally thereof and that the displacement in the manner here shown will not drag or pull material from the edge of the angle into the embossed section.

What is claimed is:

1. A pole top pin including a rolled structural angle iron body portion having a boss projecting from the angle portion of said angle iron, said boss having a bolt opening therein.

2. A pole top pin including a rolled structural angle iron body portion having a boss projecting from the angle portion of said angle iron, said boss having a bolt opening therein, the cross-sectional area of said body portion taken through said boss and opening being substantially equal to the cross-sectional area at all other points along said body.

3. A pole top pin including a rolled structural angle iron body portion having a boss projecting from the angle portion of said angle iron, said boss having a bolt opening therein, said pin further including a cylindrical upper end provided with screw threads.

4. A pole top pin including a rolled structural angle iron body portion having a boss projecting from the angle portion of said angle iron, said boss having a bolt opening therein, said pin further including a cylindrical upper end provided with screw threads, and a bifurcated lower end the sides of the bifurcated end being spread to conform to the surface of a pole.

5. A pole top pin including a rolled structural angle iron body portion having a boss projecting from the angle portion of said angle iron, said boss having a bolt opening therein, the cross-sectional area of said body portion taken through said boss and opening being substantially equal to the cross-sectional area at all other points along said body, said pin further including a cylindrical upper end provided with screw threads.

6. A pole top pin including a rolled structural angle iron body portion having a boss projecting from the angle portion of said angle iron, said boss having a bolt opening therein, the cross-sectional area of said body portion taken through said boss and opening being substantially equal to the cross-sectional area at all other points along said body, said pin further including a cylindrical upper end provided with screw threads, and a bifurcated lower end the sides of the bifurcated end being spread to conform to the surface of a pole.

WINFORD GLADSTONE MILNE.

REFERENCES CITED

The following references are of record in the file of this patent:

UNITED STATES PATENTS

| Number | Name | Date |
|---|---|---|
| 558,758 | Beardsley | Apr. 21, 1896 |
| 848,506 | Steinberger | Mar. 26, 1907 |
| 2,264,773 | Samuels et al. | Dec. 2, 1941 |